United States Patent
Takeda

(10) Patent No.: US 6,557,099 B1
(45) Date of Patent: Apr. 29, 2003

(54) MULTIPROCESSOR SYSTEM FOR DISTRIBUTIVELY DETERMINING THE IDENTITY OF A NEW CONTROL PROCESSOR BASED UPON THE IDENTITY OF THE FAILING PROCESSOR(S) STORED THEREIN

(75) Inventor: Kazumasa Takeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/476,733

(22) Filed: Dec. 30, 1999

(30) Foreign Application Priority Data

Jun. 28, 1999 (JP) .......................................... 11-181668

(51) Int. Cl.[7] .......................... G06F 15/177; H02H 3/05
(52) U.S. Cl. ............................................... 713/2; 714/2
(58) Field of Search ............................ 713/1, 2; 714/2, 714/4, 10, 23

(56) References Cited

U.S. PATENT DOCUMENTS

| | | | | |
|---|---|---|---|---|
| 5,919,266 A | * | 7/1999 | Sud et al. ..................... | 714/13 |
| 6,000,013 A | * | 12/1999 | Lau et al. .................... | 711/118 |
| 6,079,033 A | * | 6/2000 | Jacobson et al. ............. | 714/4 |
| 6,178,445 B1 | * | 1/2001 | Dawkins et al. ............. | 709/208 |
| 6,360,333 B1 | * | 3/2002 | Jansen et al. ............... | 709/202 |

FOREIGN PATENT DOCUMENTS

| JP | 56-40935 | 4/1981 |
|---|---|---|
| JP | 59-62967 | 4/1984 |

OTHER PUBLICATIONS

G. Singh, Leader Election in the Presence of Link Failures, IEEE Transactions on Parallel and Distributed Systems, vol. 7, No. 3, Mar. 1996, pp. 231–236.*

A. Arora, Distributed Reset, IEEE Transactions on Computers, vol. 43, No. 9, Sep. 1994, pp. 1026–1038.*

* cited by examiner

Primary Examiner—Thomas Lee
Assistant Examiner—Michael Nieves
(74) Attorney, Agent, or Firm—Katten Muchin Zavis Rosenman

(57) ABSTRACT

In a multiprocessor system, each processor system comprises a first storage means for storing the number of a failing processor among the processors in the processor system, a first notice acceptance means for accepting a notice of the number of a failing processor in another processor and writing the failing processor number to the first storage means, a second notice acceptance means for accepting a notice of initialization from another processor system to initialize own processor, and a notice means for issuing the notice of the initialization to all other processors. The multiprocessor system further comprises a system control processor analysis means for determining the system control processor from among the normally operating processors and a system restart control means for determining whether to perform system restart and, if own processor matches the system control processor, performing the initialization.

9 Claims, 15 Drawing Sheets

FIG. 6

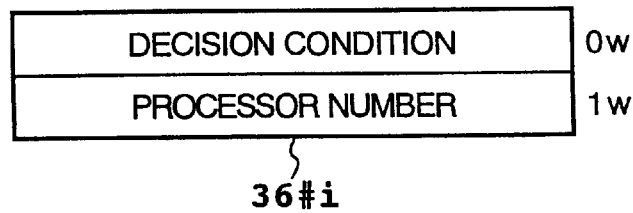

0w : SYSTEM CONTROL PROCESSOR DECISION CONDITION
  1 : FIXED
  2 : SMALLEST NUMBER AMONG CURRENTLY RUNNING PROCESSORS
  3 : LARGEST NUMBER AMONG CURRENTLY RUNNING PROCESSORS
  4 : PROCESSOR NEXT IN NUMBER TO FAILING PROCESSOR
1w : PROCESSOR NUMBER (VALID ONLY WHEN TYPE IS 1)

FIG. 7

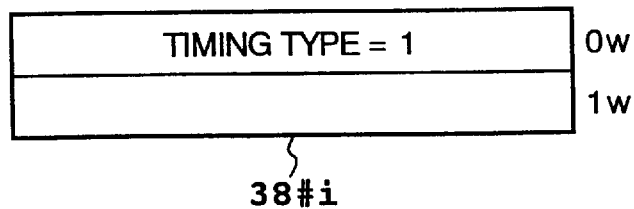

0w : SYSTEM RESTART ACTIVATION TIMING TYPE
  1 : SYSTEM RESTART ACTIVATED UPON FAILURE OF SYSTEM CONTROL PROCESSOR.
  2 : SYSTEM RESTART ACTIVATED UPON FAILURE OF n OR MORE PORCESSORS
    (n IS SPECIFIED ON LINE 1w).
1w : THE NUMBER OF PROCESSORS (VALID ONLY WHEN TYPE IS 2)

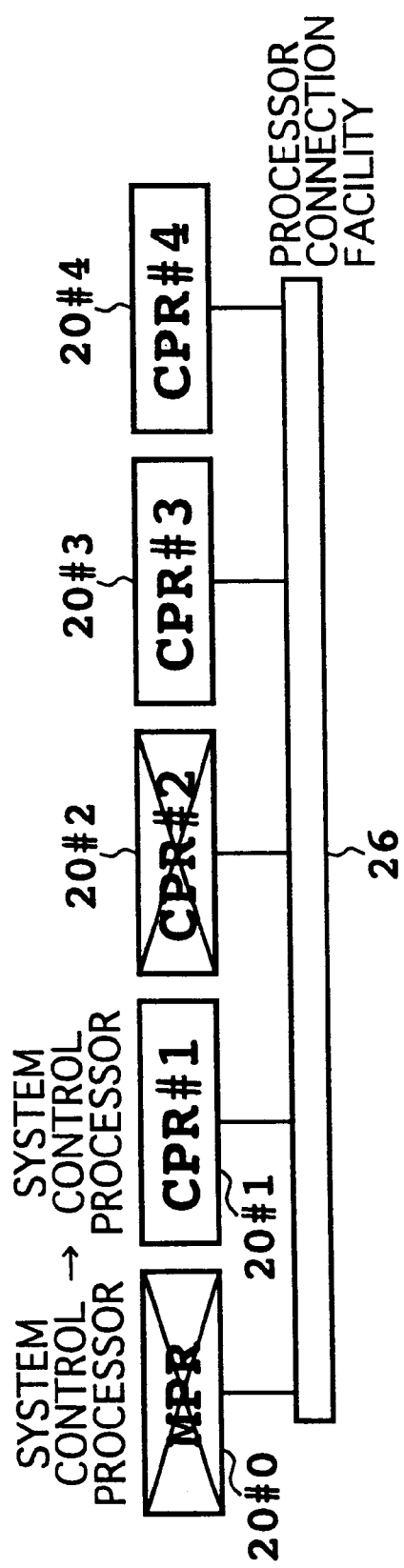

FIG. 9

| TIMING TYPE = 2 | 0w |
| --- | --- |
| NUMBER OF PROCESSORS = 2 | 1w |

38#i

0w : SYSTEM RESTART ACTIVATION TIMING TYPE
  1 : SYSTEM RESTART ACTIVATED UPON FAILURE OF
     SYSTEM CONTROL PROCESSOR.
  2 : SYSTEM RESTART ACTIVATED UPON FAILURE OF
     n OR MORE PROCESSORS
     (n IS SPECIFIED ON LINE 1w) .
1w : THE NUMBER OF PROCESSORS (VALID ONLY WHEN TYPE IS 2 )

FIG. 10

| DECISION CONDITION | 0w |
| --- | --- |
|  | 1w |

36#i

0w : SYSTEM CONTROL PROCESSOR DECISION CONDITION
  1 : FIXED
  2 : SMALLEST NUMBER AMONG CURRENTLY RUNNING PROCESSORS
  3 : LARGEST NUMBER AMONG CURRENTLY RUNNING PROCESSORS
  4 : NEXT IN NUMBER TO FAILING PROCESSOR
1w : PROCESSOR NUMBER (VALID ONLY WHEN TYPE IS 1)

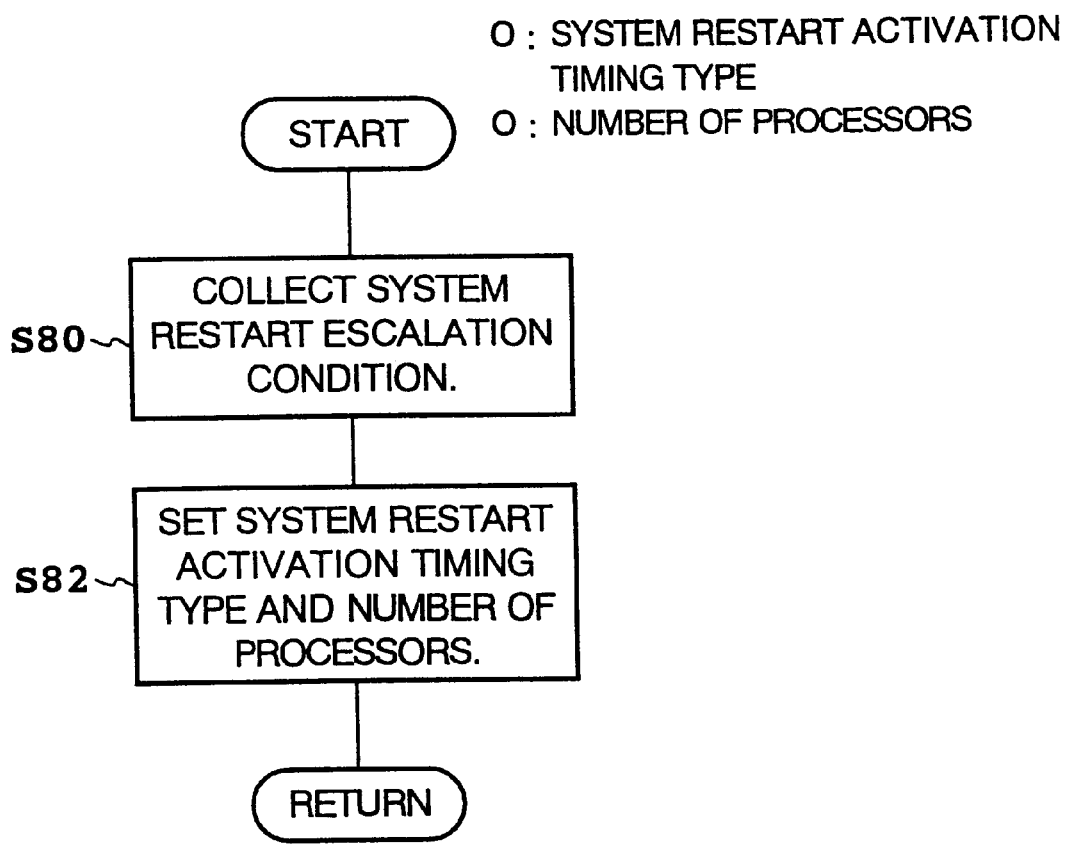

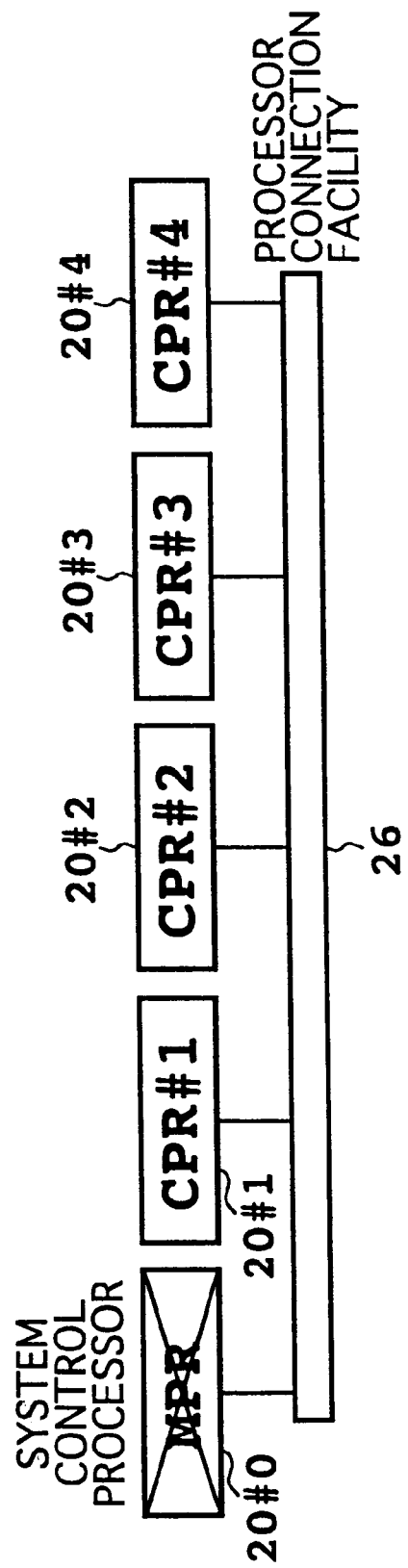

FIG. 17

| TIMING TYPE = 2 | 0w |
|---|---|
| NUMBER OF PROCESSORS = 2 | 1w |

38#i

0w : SYSTEM RESTART ACTIVATION TIMING TYPE
  1 : SYSTEM RESTART ACTIVATED UPON FAILURE OF
     SYSTEM CONTROL PROCESSOR.
  2 : SYSTEM RESTART ACTIVATED UPON FAILURE OF
     n OR MORE PROCESSORS
     (n IS SPECIFIED ON LINE 1w).
1w : THE NUMBER OF PROCESSORS (VALID ONLY WHEN TYPE IS 2)

FIG. 18

| DECISION CONDITION = 1 | 0w |
|---|---|
| MPR (1) | 1w |

38#i

0w : SYSTEM CONTROL PROCESSOR DECISION CONDITION
  1 : FIXED
  2 : SMALLEST NUMBER AMONG CURRENTLY RUNNING PROCESSORS
  3 : LARGEST NUMBER AMONG CURRENTLY RUNNING PROCESSORS
  4 : NEXT IN NUMBER TO FAILING PROCESSOR
1w : PROCESSOR NUMBER (VALID ONLY WHEN TYPE IS 1)

MULTIPROCESSOR SYSTEM FOR DISTRIBUTIVELY DETERMINING THE IDENTITY OF A NEW CONTROL PROCESSOR BASED UPON THE IDENTITY OF THE FAILING PROCESSOR(S) STORED THEREIN

BACKGROUND OF THE INVENTION

1. Field of the Invention

The present invention relates generally to a multiprocessor system in which a plurality of processors are interconnected and, more particularly, to a system restarting operation at processor failure.

2. Description of the Related Art

To enhance reliability and service by means of functional distribution and load distribution, a multiprocessor system interconnecting a plurality of processors is used. In the case of switching systems, call processing is load-distributed between two or more processors to enhance the processing speed for example. If, in such a multiprocessor system, two or more processors fail or a processor indispensable for service provision fails, the service provision is hindered. Therefore, in order to restore the failed system by instructions from one processor, a particular processor (hereafter referred to as a system control processor) is adapted to issue instructions to initialize all other processors in the system (this initialization is hereafter referred to as system restart). Conventionally, the capability of escalating the system to system restart is installed only on a fixed processor (for example, in the case of switching systems, the main processor (MPR) for maintenance control. To be more specific, because the fixed processor conventionally performs the escalation to system restart, if the fixed processor itself fails and left as it is, it cannot perform system restart control if another processor fails. Therefore, shift to system restart is made to restore the failing fixed processor and initialize the entire system.

As described, conventionally, the escalation to system restart is made upon failure of the system control processor, thereby initializing the entire system. Consequently, even if the service provision can be continued only by the processors other than the system control processor, the failure of the system control processor presents a problem in the service continuation for the escalation to system restart. Furthermore, a technology is known in which, when stopping a master computer (or a system control processor), another computer is instructed to succeed the master computer, as disclosed in Japanese Patent Laid-open No. Sho 59-62967. However, this technology requires for the master computer to issue an instruction to the succeeding computer to shift the master capability thereto, thereby presenting a problem in the continuation of system operation.

SUMMARY OF THE INVENTION

It is therefore an object of the present invention to provide a multiprocessor system that provides good service continuation.

In accordance with an aspect of the present invention, there is provided a multiprocessor system in which a plurality of processor systems including processors assigned with unique processor numbers are interconnected by a processor connection facility, each of the plurality of processor systems comprising: first storage means for storing a number of a failing processor among the processors; first notice acceptance means for accepting through the processor connection facility a first notice of the failing processor number of another processor and writing the failing processor number to the first storage means; second notice acceptance means for accepting a second notice of initialization from another processor system through the processor connection facility to initialize own processor; notice means for issuing a third notice of the initialization to all other processor systems through the processor connection facility; system control processor analysis means for determining, on the basis of the failing processor number stored in the first storage means, a system control processor from among the normally operating processors; and system restart control means for instructing the notice means to issue the third notice and initializing own processor if own processor matches the system control processor determined by the system control processor analysis means when system restart has been determined to be performed on the basis of the failing processor number stored in the first storage means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

These and other objects of the invention will be seen by reference to the description, taken in connection with the accompanying drawings, in which:

FIG. 6 is a diagram illustrating a system control processor decision condition table shown in FIG. 3;

FIG. 7 is a diagram illustrating a system restart escalation condition table shown in FIG. 3;

FIG. 8 is a diagram illustrating a transition condition of system restart according to a first embodiment of the present invention;

FIG. 9 is a diagram illustrating a system restart escalation condition table according to the first embodiment of the present invention;

FIG. 10 is a diagram illustrating a system control processor decision condition table according to the first embodiment of present invention;

FIG. 15 is a flowchart indicative of the operation of a system restart activation analysis block shown in FIG. 3;

FIG. 16 is a diagram illustrating the transition condition of system restart according to a second embodiment of the present invention;

FIG. 17 is a diagram illustrating a system restart escalation condition table according to the second embodiment of the present invention;

FIG. 18 is a diagram illustrating a system control processor decision condition table according to the second embodiment of the present invention.

DETAILED DESCRIPTION OF PREFERRED EMBODIMENTS

Figure 1:
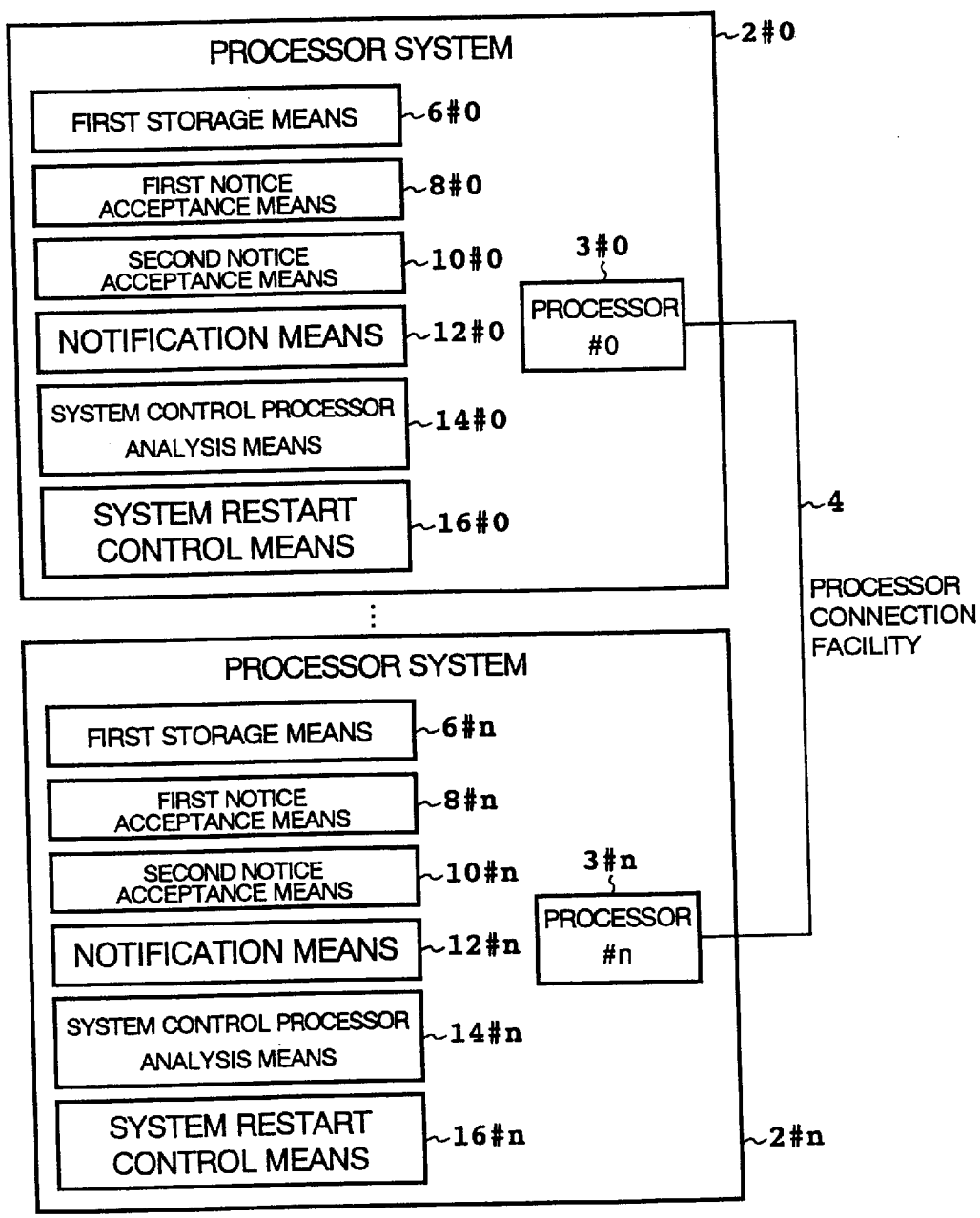
FIG. 1 is a diagram illustrating the principles of operation of the present invention.

This invention will be described in further detail by way of example with reference to the accompanying drawings. First, the principles of operation of the present invention are described. As shown in FIG. 1, in a multiprocessor system, a plurality of processor systems 2#i (i=0 to n) including processors 3#i (i=0 to n) each uniquely assigned a processor number are interconnected through a processor connection facility 4. Each of the processor systems 2#i has, in processor 3#j (j=0 to n), first storage means 6#i, first notice acceptance means for accepting a first notice of the failing processor number of another processor through the processor connection facility 4 and writing the accepted failing processing number to the first storage means 6#i, and second notice acceptance means 10#i for accepting a second notice of initialization from another processor through the processor connection facility 4 and initializing own processor 3#i.

In addition, each processor system 2#i has notification means 12#i for issuing a third notice of initialization to all other processor systems 2#j (j≠i), system control processor analysis means 14#i for selectively determining, on the basis of the failing processor number stored in the first storage means 6#i, a system control processor from among the normally running processors, and system restart control means 16#i for instructing the notification means 12#i to issue the third notice and initializing own processor 3#i if own processor 3#i matches the system control processor determined by the system control processor analysis means 14#i when performing system restart after system restart is decided on the basis of the failing processor number stored in the first storage means 6#i.

In operation, if the processor 3#j fails due to the infinite loop for example of a program executed by the processor 3#j, the processor number j of this processor is sent to the first notice acceptance means 8#i through the processor connection facility 4. The first notice acceptance means 8#i stores the accepted number j into the first storage means 6#i. On the basis of the failing processing numbers stored in the first storage means 6#i, the system control processor analysis means 14#i selectively determines a system control processor (for example, the processor having the smallest number) from among the normally running processors. On the basis of the failing processor numbers stored in the first storage means 6#i, the system restart control means 16#i determines whether to perform system restart or not. For example, the system restart control means 16#i determines system restart if m or more processors are in the failed state. In performing system restart, if the own processor 3#i matches the system control processor selectively determined by the system control processor analysis means 14#i, the system restart control means 16#i instructs the notification means 12#i to issue a third notice and, at the same time, initializes the own processor 3#i. Thus, when a processor other than a particular processor has become the system control processor, satisfying the escalation condition, the instruction for system restart is given, thereby improving service continuity.

Figure 2:
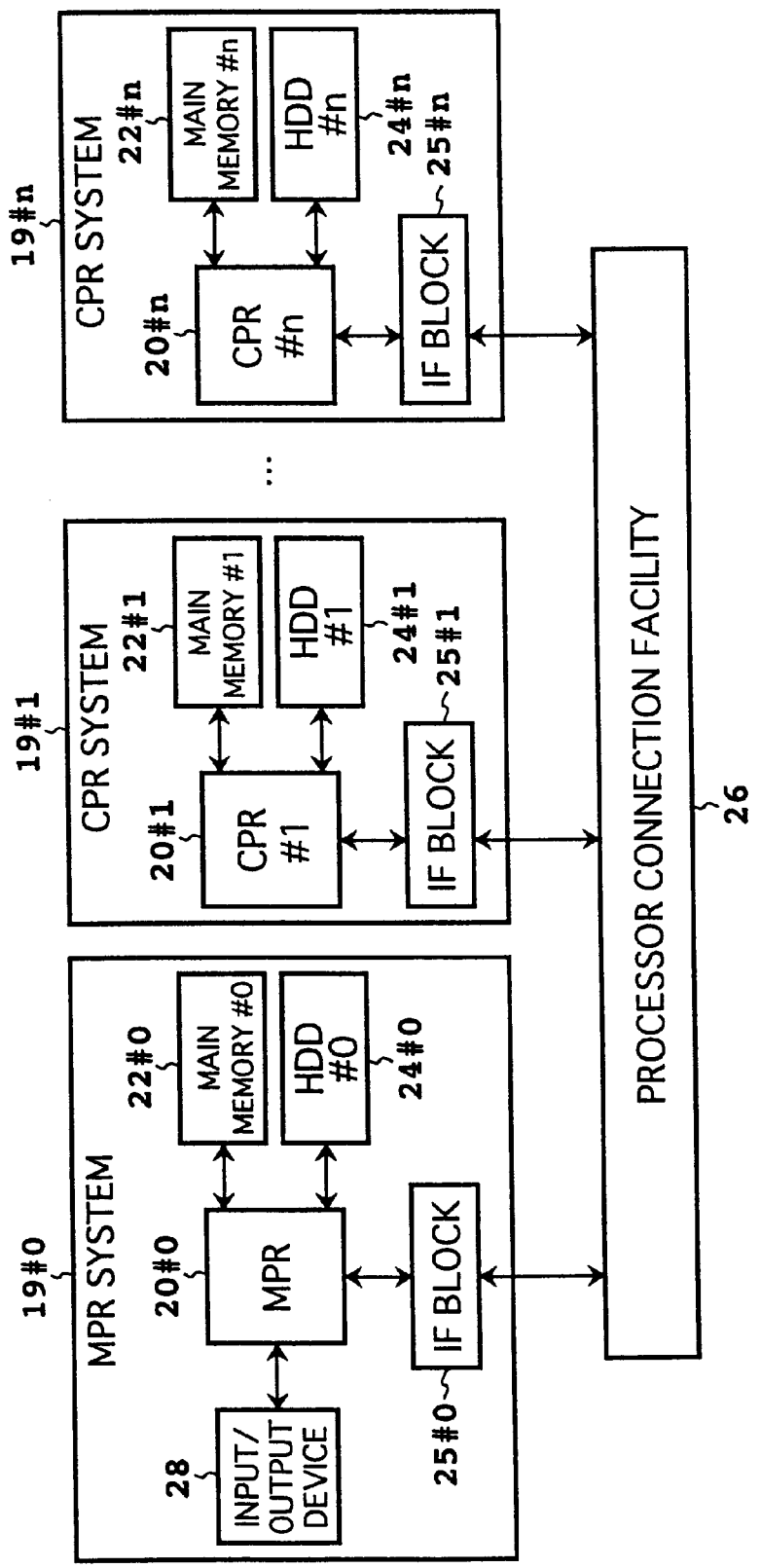
FIG. 2 is a block diagram illustrating a multiprocessor system practiced as one embodiment of the present invents

Referring to FIG. 2, there is shown the configuration of a multiprocessor system practiced as one embodiment of the present invention, the multiprocessor system being applied to a switching system. As shown, the multiprocessor system comprises an MPR system 19#0, a CPR (Call Processor) system 19#i (i=1 to n), and a processor connection facility 26. The MPR system 19#0 is a system for controlling maintenance and operation and has an MPR 20#0, a main memory 22#0, a HDD (Hard Disk Drive) #0, an IF (Interface) block 25#0, and an input/output device 28. The MPR 20#0 is a processor. The main memory 22#0 is a memory into which programs for example to be executed by the MPR 20#0 are loaded from the HDD 24#0. The HDD 24#0 stores line setting information, maintenance and operation control programs, and a system processor selection facility program for controlling the system restart escalation by selecting a system processor when a processor failure occurs, this system processor selection facility program being described later. In a receiving operation, the IF block 25#0 receives data from the processor connection facility 26, outputs the received data to the processor 20#0 to start the notice acceptance block 40#0 by causing an interrupt. In a transmitting operation, the IF block 25#0 receives data from the processor 20#0 and transmits the received data according to the interface of the processor connection facility 26. The input/output device 28 includes input devices such as a keyboard and a mouse and output devices such as a display device. For example, through the input/output device 28, maintenance personnel inputs mounted processor numbers, system control processor decision conditions, system restart escalation conditions, and line setting data, which will be described.

The CPR system 19#i (i=1 to n) is a system for call processing and has a CPR 20#i, a main memory 22#i, a HDD 24#i, and an IF block 25#i. The CPR 20#i is a processor. The main memory 22#i is a memory into which programs for example to be executed by the CPR 20#i are loaded from the HDD 24#i. The HDD 24#i is a hard disk drive for storing line setting information, call processing programs, and a system processor selection facility program for example. In a receiving operation, the IF block 25#i receives data from the processor connection facility 26 and outputs the received data to the processor 20#i and starts the notice acceptance block 40#i by causing an interrupt. In a transmitting operation, the IF block 25#i receives data from the processor 20#i and transmits the received data according to the interface of the processor connection facility 26. The processor connection facility 26 interconnects the processors 20#i (i=0 to n) and therefore may be a common bus or an ATM (Asynchronous Transfer Mode) switch for interconnecting all processors 20#i (i=0 to n) or a bus for providing interconnection in units of two processors.

Figure 3:
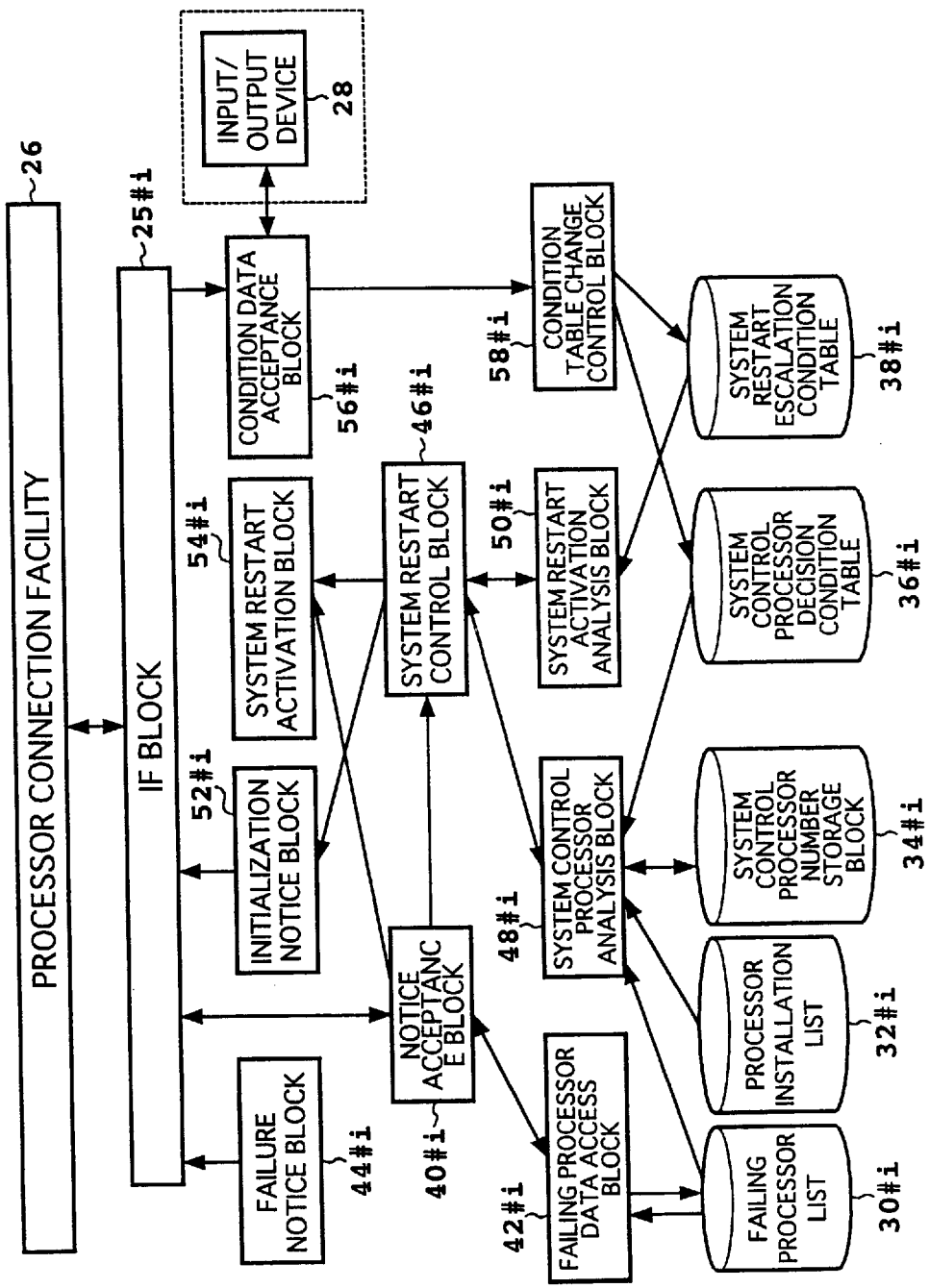
FIG. 3 is a block diagram illustrating a system control processor selection facility practiced as one embodiment of the present invention.
Figure 4:
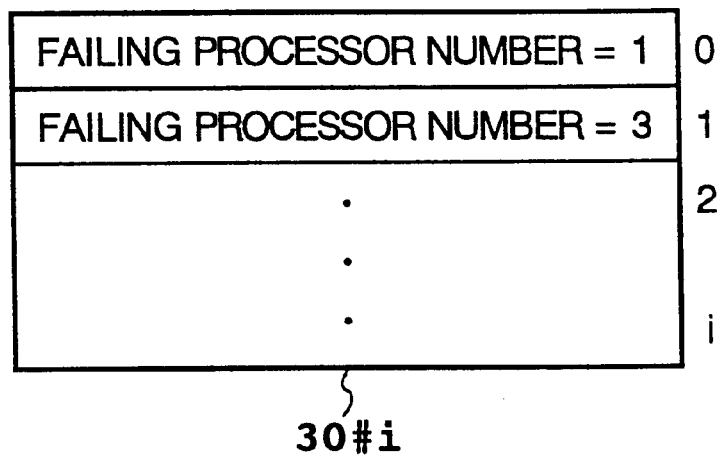
FIG. 4 is a diagram illustrating a list of failing processors.

FIG. 3 shows a system control processor selection facility according to one embodiment of the invention. As shown, the system control processor selection facility comprises a failing processor list 30#i, a processor installation list 32#i, a system control processor number storage block 34#i, a system control processor decision condition table 36#i, a system restart escalation condition table 38#i, a notice acceptance block 40#i, a failing processor data access block 42#i, a failure notice block 44#i, a system restart control block 46#i, a system control processor analysis block 48#i, a system restart activation analysis block 50#i, an initialization notice block 52#i, a system restart activation block 54#i, a condition data acceptance block 56#i, and a condition change control block 58#i, which are stored on the HDD 24#i shown in FIG. 2 as programs and files. FIG. 4 shows the failing processor list 30#i shown in FIG. 3. As shown in FIG. 4, the failing processor list 30#i is made up of a plurality of areas of a fixed length for storing processor numbers and is allocated in the main memory 22#i as a data area. Each of these areas stores failing processor numbers. The processor installation list 32#i is made up of a plurality of areas of a fixed length for storing installed processor numbers. Each of these areas stores the processor numbers 0 to n of the processors 20#0 to 20#n installed on the multiprocessor system shown in FIG. 2.

Figure 5:
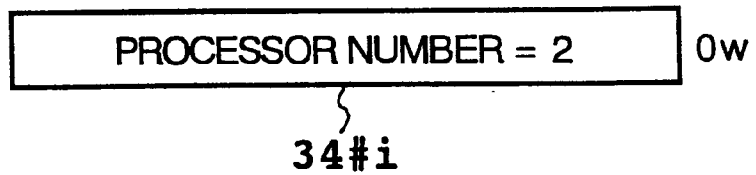
FIG. 5 is a diagram illustrating a system control processor number storage block shown in FIG. 3.

FIG. 5 shows the configuration of the system control processor number storage block 34#i shown in FIG. 3. As shown in FIG. 5, the system control processor number storage block 34#i stores the current system control processor number and is allocated in the main memory 22#i as a data area. FIG. 6 shows the system control processor decision condition table 36#i shown in FIG. 3. As shown in FIG. 6, the system control processor decision condition table 36#i stores a system control processor decision condition at line 0w and a processor number at line 1w. This table is stored on the HDD 24#i as a file.

The system control processor decision condition is a number indicative of the type of a condition for determining the system control processor. The condition is that, in all processor systems 19#0 through 19#n, the same processor must be selected as the system control processor. The decision condition is one of the following for example: 1=fixed (the system control processor is fixed); 2=the processor having the smallest number among the normally running processors; 3=the processor having the largest number among the normally running processors; and 4=the processor next in number to the failing processor. These numbers are set according to the operation form of the system. If the type of the system control processor decision condition is fixed (=1), the processor number is the number of the fixed system control processor. It should be noted that the fixed number is included in the types of the decision conditions to make the system operation flexible and make it possible to change the types appropriately during operation, which will be described later.

FIG. 7 shows the system restart escalation condition table 38#i. As shown, this condition table stores the system restart activation timing type at line 0w and the number of processors at line 1w. The system restart activation timing type is a type number indicative of the condition for system restart activation timing, which is determined from the viewpoint of service continuity and the prevention of service degradation due to the discontinued service by a failed processor. For example: 1=the system is restarted when the system control processor fails; and 2=the system is restarted when n or more processors fail. The number of processors is the number of failed processors to cause the system restart activation when the system restart activation timing type is 2. The system restart escalation condition table 38#i is stored in the HDD 24#i as a file.

The notice acceptance block 40#i is a program to be activated by the IF block 25#i through an interrupt or by the failure notice block 44#i. This program receives processor's failure notice and/or failure recovery notice and an initialization notice to perform the following processing operations.

(a) In the case of failure and/or failure recovery notice, the failing processor data access block 42#i is called to add the failing processor number to or delete the failure recovery processor number from the failing processor list 30#i. In the case of failing notice, the system restart control block 46#i is called to determine the system control processor and, if the system restart escalation condition is satisfied, system restart is performed.

(b) In the case of initialization notice, the system restart activation block 54#i is called to perform system restart. It should be noted that initialization notice is issued also when the processor 20#i is failing. However, because the memory address of the notice acceptance block 40#i has been registered as an interrupt vector address, system restart can be performed also in the failing processor 20#i by the interrupt from the IF block 25#i by which the notice acceptance block 40#i is activated even when the processor 20#i is failing.

The failing processor data access block 42#i is a program which is called by the notice acceptance block 40#i. Failure or failure recovery and the failing processor number of failure recovered processor number are entered in the failing processor data access block 42#i. In the case of failure, the failing processor data access block 42#i adds the failing processor number to the failing processor list 30#i. In the case of failure recovery, the failing processor data access block 42#i deletes the failure recovered processor number from the failing processor list 30#i.

The failing processor data access block 46#i is a program which is called by the notice acceptance block 40#i. The failing processor number is entered in the failing processor data access block 46#i. By calling the system control processor analysis block 48#i, a new system control processor number is determined. By calling the system restart activation analysis block 50#i, the system restart timing type and the number of processors stored in the system restart escalation condition table 38#i are collected to perform the following processing operations.

(a) If the system control processor decision condition is 1 (fixed), and if the own processor is the system control processor, the initialization notice block 52#i is called to send system restart notice to another processors 20#j through the processor connection facility 26 and, by calling the system restart activation block 54#i, system restart is performed.

(b) If the system control processor decision condition is 2, and if the number of failing processors≧the number of processors n listed at line 1w of the system restart escalation table 38#i and the own processor is the new system control processor, the initialization notice block 52#i is called to send system restart notice to the processor 20#j through the IF block 25#i and the processor connection facility 26. Then, system restart is performed by calling the system restart activation block 54#i.

The system control processor analysis block 48#i is a program which is called by the system restart control block 46#i and outputs the current system control processor number to the system restart control block 46#i. According to the system control processor condition table 36#i, the new system processor number is determined, the determined processor number is written to the system control processor number storage block 34#i to replace the old number, and the new system processor number is outputted to the system restart control block 46#i. The new system control processor is determined when the failing processor notice comes. The determination is made in two ways. First, the determination is always made upon reception of the failing processor notice regardless whether the current system control processor is failing or not. Second, the determination is made only when the current system control processor fails. In the current embodiment, the first method is used. The system restart activation analysis block 50#i is a program which is called by the system restart control block 46#i and collects the escalation condition from the system restart escalation condition table 38#i and outputs the system restart activation timing type and the number of processors to the system restart control block 46#i.

The initialization notice block 52#i is a program which is called by the notice acceptance block 40#i or the system restart control block 46#i and sends system restart notice to the processor 20#j (j≠i) through the IF block 25#i and the processor connection facility 26. The system restart activation block 54#i is a program which is called by the notice acceptance block 40#i or the system restart control block 46#i and performs system restart (or initial program loading: IPL). The condition data acceptance block 56#i accepts a system control processor decision condition of change and a system restart escalation condition of change and calls the condition table change control block 58#i to update the system control processor decision table 36#i and the system restart escalation condition table 38#i. It should be noted that the system control processor decision condition and the system restart escalation condition are inputted from the input/output device 28 in the case of the MPR system 19#0. In the case of the CPR system 19#i (i=1 to n), these conditions are inputted from the MPR 20#0 through the IF block 15#0 and the processor connection facility 26.

The condition table change control block 58#i is a program which is called by the condition table acceptance block 56#i, receives the change type and the change data, and, according to the received change type, sets the received change data to the system control processor condition table 36#i or the system restart escalation condition table 38#i.

The following describes the operation of the system control processor selection facility according to the invention.

(1) Setting the processor installation list 32#0 and so on:

The MPR 20#0 starts when the power to the system is turned on for example. When the MPR 20#0 has started, maintenance personnel for example enters from the input/output device 28 the processor installation list, the system control processor decision condition, and the system restart escalation condition. The MPR 20#0 enters these items of data into the files of the processor installation list 32#0, the system control processor decision condition table 36#0, and the system restart escalation condition table 38#0 respectively on the HDD#0.

(2) Setting the processor installation list 32#i and so on:

The MPR 20#0 enters the processor installation list and the own processor number into the files of the processor installation list 32#i and so on in a standalone manner on the HDD 24#i. Alternatively, the MPR 20#0 sends the processor installation list and so on to the CPR 20#i (i=1 to n) through the IF block 25#0 and the processor connection facility 26. The CPR 20#i receives the processor installation list and so on through the processor connection facility 26 and the IF block 25#i and enters the received data into the files of the processor installation list 32#i and so forth on the HDD 24#i.

(3) Starting MPR 20#0 and CPR 20#i:

When the MPR 20#0 and the CPR 20#i start by power-on sequence for example, a default processor, for example the MPR 20#0 becomes the system control processor. For example, when the MPR 20#0 and the CPR 20#i (i=1 to n) have started, the number of the default system control processor (the processor number 0 of the MPR 20#0) is written to the system control processor storage block 34#i.

(4) A dedicated failure monitor circuit, not shown, and the processor 20#i are monitoring the processor 20#i for failure, monitoring by the processor 20#i being made itself autonomously. The causes of the failure of the processor 20#i include a software failure due to the occurrence of program interrupts such as infinite loop and instruction exception. The failure of the processor 20#i is determined by the failure monitor circuit when the processor 20#i for example sends notice to the failure monitor circuit at certain intervals and if the processor 20#i sends no notice for more than a certain period of time. Furthermore, if the processor 20#i has caused a program interrupt such as instruction exception for example, the OS (Operating System) of the processor 20#i determines that its processor 20#i has failed. In addition, it is also practicable for a particular processor 20#j, for example the MPR 20#0 or the current system control processor, to detect the failure of the processor 20#i. When the failure of the processor 20#i has been detected, the failure notice block 44#i is activated by the interrupt from the failure monitor circuit or by the OS. The failure notice block 44#i sends the failure notice and the own processor number (the failed processor number) received through the IF block 25#i to the processor connection facility 26 and, at the same time, to the initialization notice block 52#i. When the failure of the processor 20#i has been recovered, the failure notice block 44#i sends the failure recovery notice and the own processor number (the failure recovered processor number) received through the IF block 25#i to the processor connection facility 26 and, at the same time, to the initialization notice block 52#i.

First Embodiment

FIG. 8 shows the condition of transition to system restart according to the first embodiment of the present invention. As shown, in the current multiprocessor system, the failure of two or more processors causes transition to system restart. For example, if the MPR 20#0 and the CPR 20#2 fail, transition to system restart is performed. It should be noted that FIG. 8 shows the case in which n=4. For example, the following describes the case in which, if the MPR 20#i, which is the system control processor, fails first and then the CPR 20#3 fails, amounting to a total of two failing processors, thereby causing the transition to system restart. FIG. 9 shows the system restart escalation condition table 38#i according to the first embodiment of this invention. As shown, system restart timing activation timing type being 2 and the number of processors being 2 are set to the system restart escalation condition table 38#i. FIG. 10 shows the system control processor decision condition table 36#i according to the first embodiment of this invention. As shown, decision condition 2 (the smallest number of the currently operating processor numbers) is set to the system control processor decision condition table 36#i as the system decision condition.

(1) When the MPR 20#0, the system control processor, has failed:

The failure notice block 44#0 sends the failing processor number 0 and the failure notice information to the processor connection facility 26 through the IF block 25#0. The IF blocks 25#1 through 25#n receives the failing processor number 0 and the failure notice information from the processor connection facility 26, outputs these items of information to processors 20#1 through 20#n, and activates notice acceptance blocks 40#1 through 40#n by interrupt. Also, the failure notice block 44#0 activates the notice acceptance block 40#0.

Figure 11:
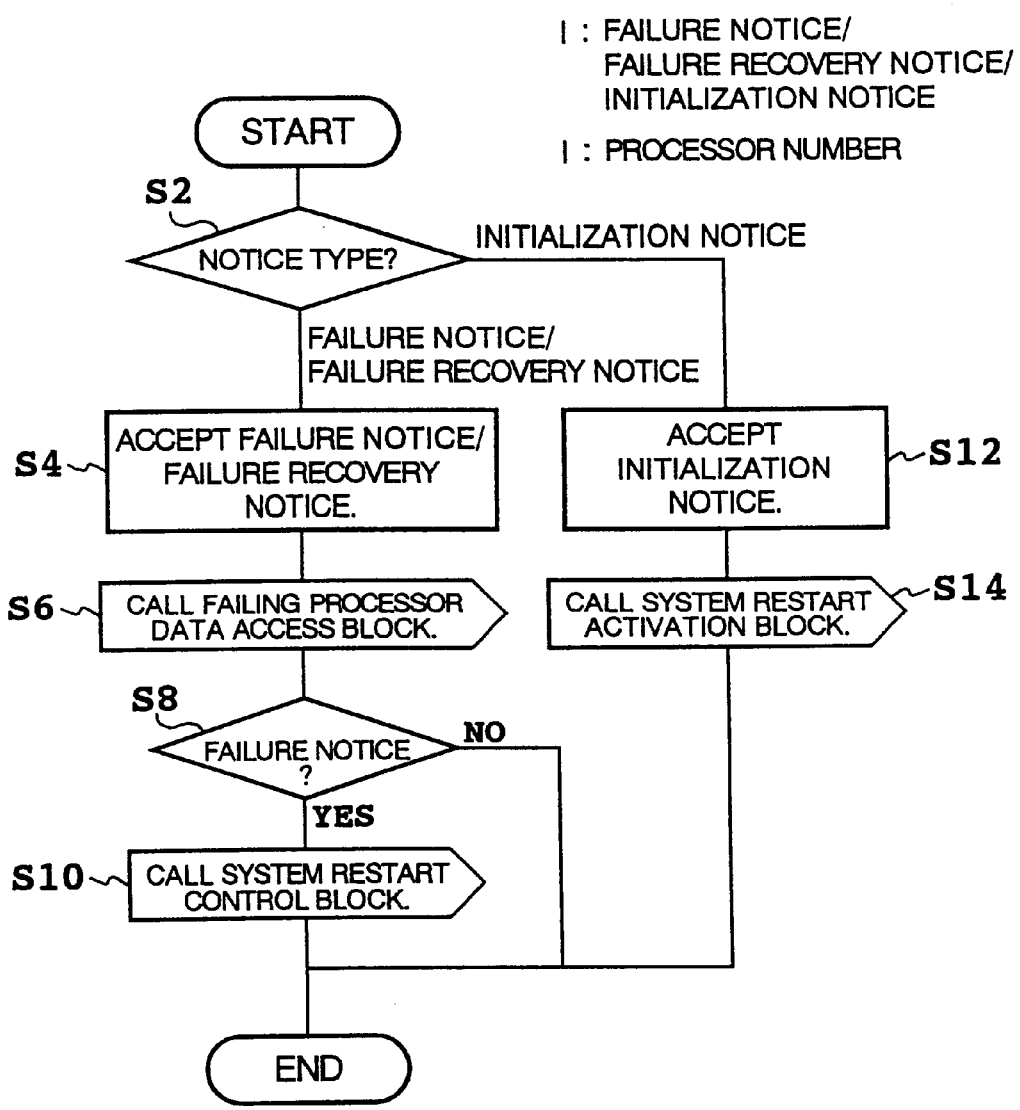
FIG. 11 is a flowchart indicative of the operation of a notice acceptance block shown in FIG. 3.

(a) Operation of the notice acceptance block 40#i:

FIG. 11 is a flowchart indicative of the operation of the notice acceptance block 40#i shown in FIG. 3. In step S2, the notice acceptance block 40#i (i=0 to n) determines that the notice type is failure notice because this notice is the failure notice of the MPR 20#0 and the step goes to step S4. In step S4, the notice acceptance block 40#i extracts the information associated with failure notice/failure recovery notice. In step S6, the notice acceptance block 40#i sets failure/failure recovery notice and failing processor number 0 as arguments and calls the failing processor data access block 42#i.

Figure 12:
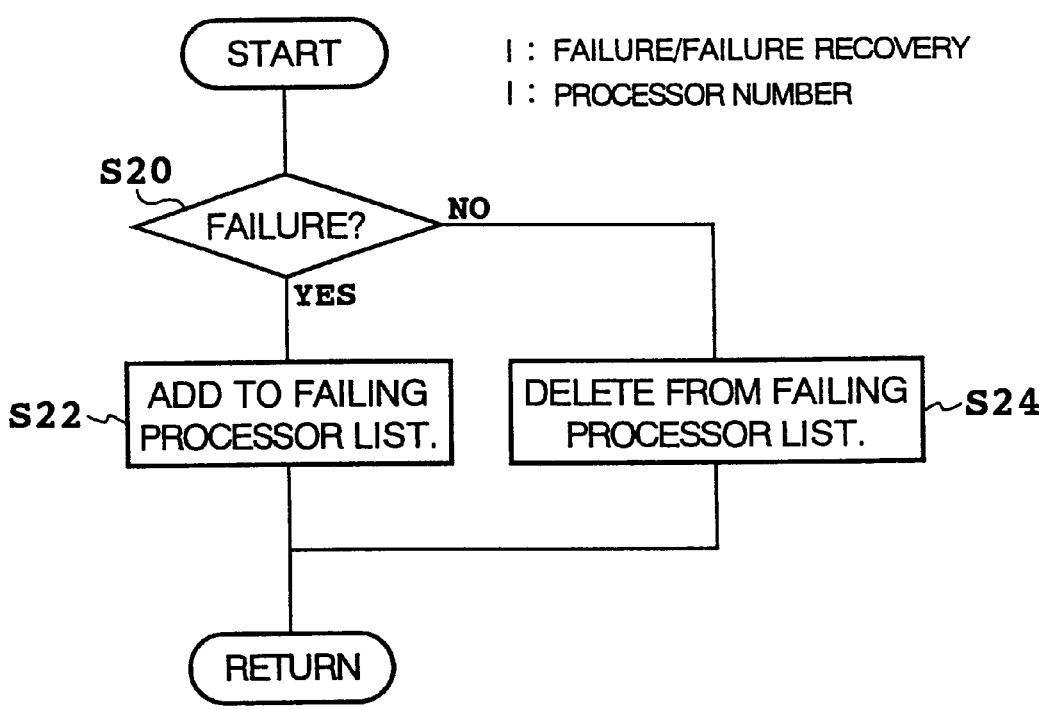
FIG. 12 is a flowchart indicative of the operation of a failing processor data access block shown in FIG. 3.

(b) Operation of the failing processor data access block 42#i:

FIG. 12 is a flowchart indicative of the operation of the failing processor data access block 42#I as shown in FIG. 3. In step S20, the failing processor data access block determines that this notice is failure notice. In step S22, the failing processor data access block 42#i adds failing processor number 0 to the failing processor list 30#i and returns. If this notice is failure recovery notice, then, in step S24, the failing processor data access block 42#i deletes the failure recovery processor number from the failing processor list 30#i. For example, the area in which the failure recovery processor number has been stored is written over with the failing processor number stored in the subsequent area. In step S10 shown in FIG. 11, the failing processor data access block 42#i sets the notified failing processor number as an argument and then calls the system restart control block 46#i.

Figure 13:
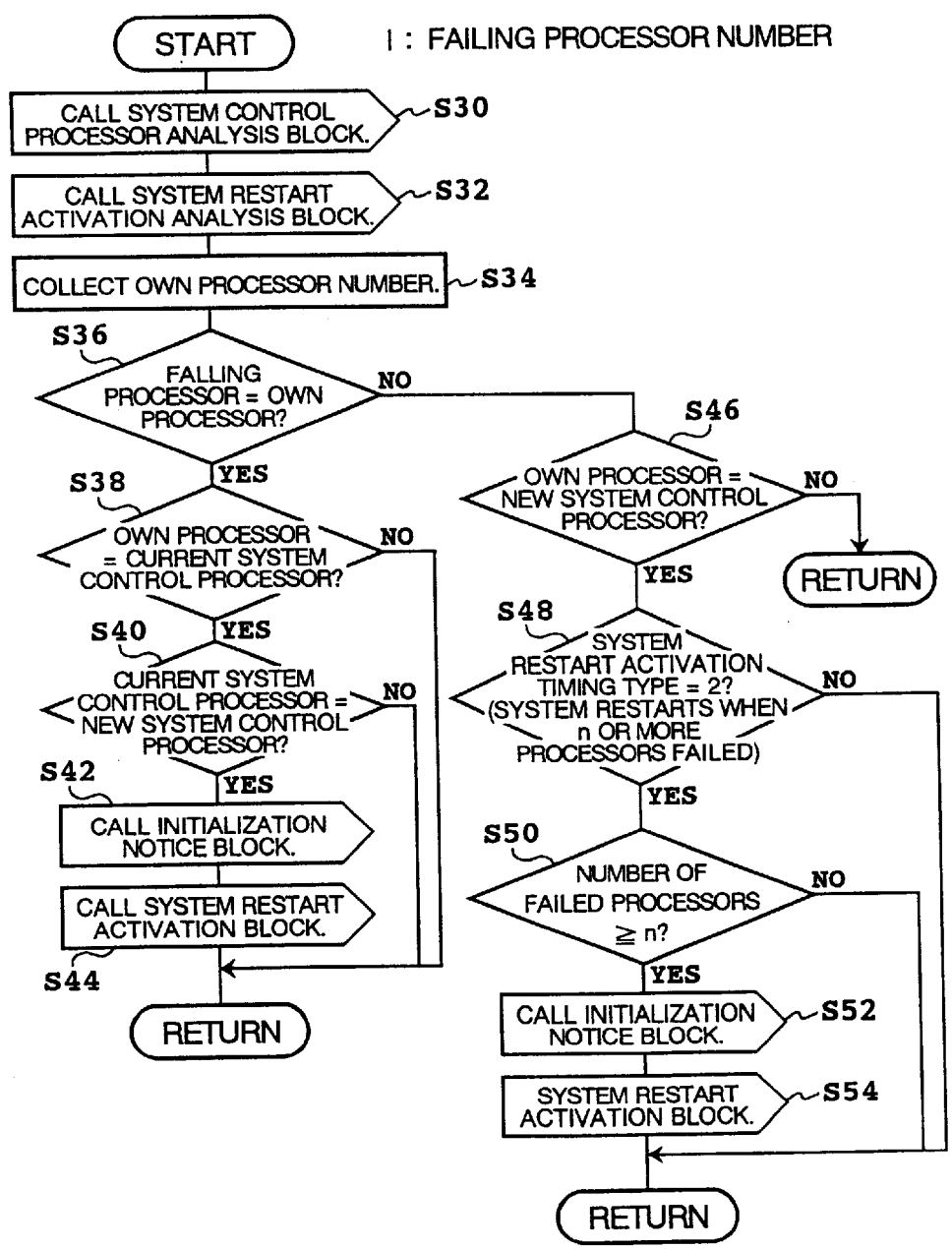
FIG. 13 is a flowchart indicative of the operation of a system restart control block shown in FIG. 3.

(c) Operation of the system restart control block 46#i:

FIG. 13 is a flowchart indicative of the operation of the system restart control block 46#i as shown in FIG. 3. In step S30, the system restart control block 46#i calls the system control processor analysis block 48#i.

Figure 14:
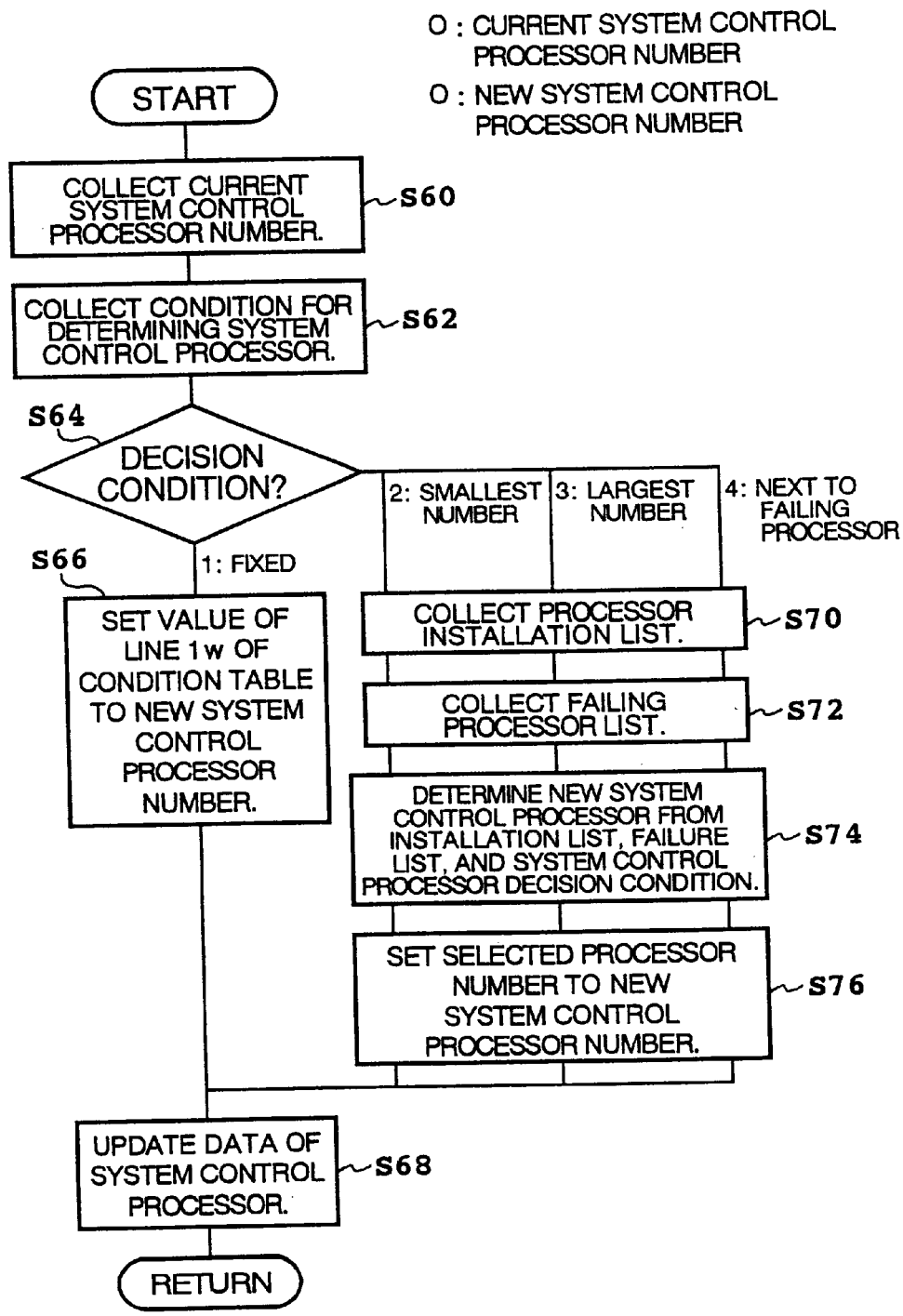
FIG. 14 is a flowchart indicative of the operation of a system control processor analysis block shown in FIG. 3.

(d) Operation of the system control processor analysis block 48#i:

FIG. 14 is a flowchart indicative of the operation of the system control processor analysis block 48#i shown in FIG. 3. In step S60, the system control processor analysis block 48#i acquires current system control processor number 0 from the system control processor number storage block 34#i. In step S62, the system control processor analysis block 48#i acquires condition 2 for determining the system control processor from the system control processor decision condition table 36#i. In step S64, because the decision condition is 2, the system control processor analysis block 48#i goes to step S70. In step S70, the system control processor analysis block 48#i acquires the installed processor number list (installed processor numbers 0, 1, . . . , n) from the processor installation list 32#i. In step S72, the system control processor analysis block 48#i collects the lists of failing processors from the failing processor list 30#i. In the current example, the failing processor number 0 is collected. In step S74, the system control processor analysis block 48#i determines a new system processor number as follows from the installation list, the failure list, and the system control processor decision condition. Since the decision condition is 2, the smallest numbered processor in the installation list 32#i and not in the failure list 30#i is determined. In the current example, processor number 0 is entered in the failure list 30#i, so that the smallest processor number 1 is determined. It should be noted that, if the decision condition is 3, the largest numbered processor not entered in the failing processor list 32#i in the installation lists is determined. If the decision condition is 4, the normal processor having the largest number or the smallest number entered in the failure list or the processor, not in the failure state, having the number next to the lastly entered processor number is determined. In step S76, the system control processor analysis block 48#i sets the processor number selected as the new system control processor number. In step S68, the system control processor analysis block 48#i updates the system control processor storage block 34#i by the new system control processor number 1 and sets the new system control processor number and the new system processor number as arguments, upon which the processing comes to an end. In step S32 shown in FIG. 10, the system control processor analysis block 48#i calls the system restart activation analysis block 50#i.

(e) Operation of the system restart activation analysis block 50#i:

FIG. 15 is a flowchart indicative of the operation of the system restart activation analysis block 50#i shown in FIG. 3. In step S80, the system restart activation analysis block 50#i collects the system restart escalation condition table 38#i. In step S82, the system restart activation analysis block sets the system restart activation timing type and the number of processors as arguments and returns. In the current example, the system restart activation timing type is set to 2 and the number of processors to 2.

(c-1) The operation of the system restart control block 46#0 of the MPR 20#0:

Referring to FIG. 13 again, the system restart control block 46#0 acquires own processor number 0 from the HDD 24#0 for example in step S34. In step S36, because the failing processor number is 0 and the own processor number is 0, the system restart control block 46#0 determines that there is a match between these processor numbers and goes to step S38.

In step S38, because the own processor number is 0 and the currently running system processor number is 0, the system restart control block 46#0 determines that there is a match between these processor numbers and goes to step S40. In step S40, the own processor number is 0 and the new system processor number is 1, so that the system restart control block 46#0 determines there is no match between these processor numbers and returns.

(c-2) Operation of the system restart control block 46#1 of the CPR 20#1:

In step S34 shown in FIG. 13, the system restart control block 46#1 acquires own processor number 1 from the HDD 24#1 for example. In step S36, because the failing processor number is 0and the own processor number is 1, the system restart control block 46#1 determines that there is no match between these processor numbers and goes to step S46. In step S46, because the own processor number is 1 and the new system processor number is 1, the system restart control block 46#1 determines that there is a match between these processor numbers and goes to step S48. In step S48, the system restart control block 46#1 determines that the system restart activation timing type is 2 and goes to step S50. In step S50, the system restart control block 46#1 determines that the number of failing processors is 1 and therefore smaller than the number of processors of 2 and returns.

(c-3) Operation of the system restart control block 46#i of the CPR 20#i (i≧2):

In step S34 shown in FIG. 13, the system restart control block 46#i acquires own processor number i (i≧2) from the HDD 24#i for example. In step S36, because the failing processor number is 0 and the own processor number is i (i≧2), the system restart control block 46#i determines that there is no match between these processor numbers and goes to step S46. In step S46, because the own processor number is i and the new system processor number is 1, the system restart control block 46#i determines that there is no match between these processor numbers and returns. Thus, if only the MPR 20#0 so far functioning as the system processor has failed, the system restart escalation condition is not satisfied, so that system restart is not performed. This is because there is no problem in the service continuity by the CPR 20#i if the MPR 20#0 alone fails.

The notice acceptance block 40#i ends its processing after the processing by the system restart control block 46#i is ended in step S10 shown in FIG. 11. Then, in the CPR 20#i, call processing is restarted. Thus, call processing is restarted in the CPR 20#i after having been temporarily discontinued for only a short time required for the determination of system restart activation due to the failure of the MPR 20#0, causing no problem in service continuity.

(2) When the CPR 20#2 has failed next:

The failure notice block 44#2 outputs the system control processor number 2 and the failure notice information to the processor connection facility 26 through the IF block 25#2. The IF block 40#i (i≠2) receives the system control processor number 2 and the failure notice information and outputs these items of information to the processor 40#i (i≠2) and, at the same time, activates the notice acceptance block 40#i by causing an interrupt.

(a) Operation of the notice acceptance block 40#i:

The notice acceptance block 40#2 is activated by the failure notice block 44#2. In step S2, the notice acceptance block 40#i (i=0 to n) determines that this notice is a failure notice because it is the failure notice of the CPR 20#2 and goes to step S4. In step S4, the notice acceptance block 40#i takes out the failure notice and the failing processor number 2. In step S6, the notice acceptance block 40#i sets the failure notice and the failing processor number 2 as arguments for example and calls the failing processor data access block 42#i.

(b) Operation of the failing processor data access block 42#i:

Because this notice is a failure notice, the failing processor data access block 42#i determines that this notice is a failure notice in step S20 of FIG. 12 and goes to step S22. In step S22, the failing processor data access block 42#i adds the failing processor number 1 to the failing processor list 30#i and returns. Consequently, the failing processor numbers 0 and 2 are added to the failing processor list 30#i.

(c) Operation of the system restart control block 46#i:

In step S30 of FIG. 13, the system restart control block 46#i calls the system control processor analysis block 48#i.

(d) Operation of the system control processor analysis block 48#i:

In step S60 shown in FIG. 14, the system control processor analysis block 48#i acquires the current system control processor number 1 from the system control processor number storage block 34#i. In step S62, the system control processor analysis block 48#i acquires condition 2 for determining the system control processor from the system control processor decision condition table 36#i. In step S64, because the decision condition is 2, the system control processor analysis block 48#i goes to step S70. In step S70, the system control processor analysis block 48#i acquires the installed processor number list (installed processor numbers 0, 1, . . . , n) from the processor installation list 32#i. In step S72, the system control processor analysis block 48#i collects the list of failing processor numbers from the failing processor list 30#i. In the current example, failing processing numbers 0 and 2 are collected. In step S74, the system control processor analysis block 48#i determines the new system processor number from the installation list, the failure list, and the system control processor decision condition as follows. Since the decision condition is 2, the smallest numbered processor in the installation list 32#i and not in the failure list 30#i is determined. In the current example, processor numbers 0 and 2 are entered in the failure list 30#i, so that the smallest processor number 1 is determined. In step S76, the system control processor analysis block 48#i sets the selected processor 1 to the new system control processor number. In step S68, the system control processor analysis block 48#i updates the system control processor storage block 34#i by the new system control processor number 1, sets the current system control processor number 1 and the new system control processor number 1 as arguments for example, and returns. In step S32 of FIG. 13, the system control processor analysis block 48#i calls the system restart activation analysis block 50#i.

(e) Operation of the system restart activation analysis block 50#i:

In step S80 of FIG. 15, the system restart activation analysis block 50#i collects the system restart escalation condition table 38#i. In step S82, the system restart activation analysis block 50#i sets the system restart activation timing type and the number of processors as arguments for example and returns. In the current example, the system restart activation timing type 2 and the number of processors of 2 are set.

(c-1) Operation of the system restart control block 46#2 of the CPR 20#2:

In step S34 of FIG. 13, the system restart control block 46#2 acquires own processor number 2 from the HDD 24#0 for example. In step S36, because the failing processor number is 2 and the own processor number is 2, the system restart control block 46#2 determines that there is a match between these processor numbers and goes to step S38.

In step S38, because the own processor number is 2 and the current system processor number is 1, the system restart control block 40#2 determines that there is no match between these processor numbers and returns.

(c-2) Operation of the system restart control block 46#1 of the CPR 20#1:

In step S34 of FIG. 13, the system restart control block 46#1 acquires own processor number 1 from the HDD 24#1 for example. In step S36, because the failing processor number is 2 and the own processor number is 1, the system restart control block 46#1 determines that there is no match between these processor numbers and goes to step S46. In step S46, because the own processor number is 1 and the new system processor number is 1, the system restart control block 46#1 determines that there is a match between these processor numbers and goes to step S48. In step S48, the system restart control block 46#1 determines that the system restart activation timing type is 2 and goes to step S50. In step S50, the system restart control block 46#1 determines that there is a match between the number of failing processors of 2 and the number of processors of 2 set to the system restart escalation condition table 38#i and goes to step S52. In step S52, the system restart control block 46#1 calls the initialization notice block 52#1. The initialization notice block 52#1 sends initialization notice information to the processor connection facility 26 through the IF block 25#i. The IF block 25#i of another processor system 19#i (i≠1) receives the initialization notice information from the processor connection facility 26, outputs the received information to the processor 20#i, and activates the notice acceptance block 40#i by causing an interrupt. In step S2 of FIG. 11, the notice acceptance block 40#i determines the notice type and accepts the initialization notice in step S12. In step S14, the notice acceptance block 40#i calls the system restart activation block 54#i, activating system restart. Thus, system restart is performed in the processors 20#i except for the processor 20#1. On the other hand, in the processor 20#1, the system restart control block 46#1 calls the system restart activation block 54#1 in step S54, activating system restart.

(c-3) Operation of the system restart control block 46#i of the CPR 20#i (i≧3):

In step S34 of FIG. 13, the system restart control block 46#i acquires own processor number i (i≧3) from the HDD 24#i for example. In step S36, because the failing processor number is 2 and the own processor number is i (i≧3), the system restart control block 46#i determines that there is no match between these processor numbers and goes to step S46. In step S46, because the own processor number is i (i≧3) and the new system processor number is 1, the system restart control block 46#i determines that there is no match between these processor numbers, thereby ending the processing. In the above-mentioned example, the case in which the MPR 20#0 has failed has been described by way of example. If the MPR 20#0 has not failed but if two or more CPRs 20#i have failed, the MPR 20#0 sends the notice of system restart to all other CPRs 20#i. Thus, if the MPR 20#0 has failed, unless the condition set to the system restart escalation condition table is satisfied, the service is continued without making system restart. If the number of failing processors satisfies the condition set to the system restart escalation condition table 38#i, the CPR 20#j becomes the system control processor according to the decision condition of the system control processor condition table 36#i to perform system restart.

Second Embodiment

FIG. 16 shows the condition of transition to system restart according to the second embodiment of the current invention. As shown, in this embodied multiprocessor system, the transition to system restart is made if the fixed system control processor has failed. It should be noted that, in FIG. 16, n=4.

FIG. 17 shows the system restart escalation condition table 38#i according to the second embodiment of the present invention. As shown, in this example, the system restart escalation condition table 38#i has system restart activation timing type 1 is set at line 0w. FIG. 18 shows the system control processor decision condition table 36#i according to the second embodiment of the present invention. As shown, the system control processor decision table 36#i has system control decision condition 1 at line 0w and processor number 0 of the processor number MPR 20#0 at line 1w. Thus, setting these values to the system restart escalation condition table 38#i and the system control processor decision condition table 36#i allow the second embodiment to shift to system restart if the fixed system control processor has failed and system restart is required, thereby providing flexible system operation. If the MPR 20#0, which is the system control processor, has failed, the failure notice block 44#0 outputs system processor number 0 and the failure notice information from the IF block 25#0 to the processor connection facility 26. IF block 40#i (i≠0) receives the system control processor number 0 and the failure notice information, outputs these items of information to the processor 40#i (i≧0), and activates the notice acceptance block 40#i by causing an interrupt.

(a) Operation of the notice acceptance block 40#i:

The notice acceptance block 40#0 is activated by the failure notice block 44#0. In step S2 of FIG. 11, the notice acceptance block 40#i (i=0 to n) determines that this notice is a failure notice because this notice is about the failure of the MPR 20#0 and goes to step S4. In step S4, the notice acceptance block 40#i takes out the failure notice and the failing processor number 0. In step S6, the notice acceptance block 40#i sets the failure notice and the failing processor number 0 as arguments for example and calls the failing processor data access block 42#i.

(b) Operation of the failing processor data access block 42#i:

In step S20 of FIG. 12, the failing processor data access block 42#i determines that this notice is a failure notice and goes to step S22. In step S22, the failing processor data access block 42#i adds the failing processor number 0 to the failing processor list 30#i and returns. Thus, the failing processor number 0 is entered in the failing processor list 30#i.

(c) Operation of the system restart control block 46#i:

In step S30 of FIG. 13, the system restart control block 46#i calls the system control processor analysis block 48#i.

(d) Operation of the system control processor analysis block 48#i:

In step S60 of FIG. 14, the system control processor analysis block 48#i acquires the current system control processor number 0 from the system control processor number storage block 34#i. In step S62, the system control processor analysis block 48#i acquires the condition 1 for determining the system control processor from the system control processor decision condition table 36#i. In step S64, since the condition is 1, the system control processor analysis block 48#i goes to step S66. In step S66, the system control processor analysis block 48#i sets the value (=0) at line 1w in the condition table 36#i to the new system control processor number. In step S68, the system control processor analysis block 48#i updates the system control processor storage block 34#i by the new system processor number 0, sets the current system control processor number 0 and the new system processor number 0 as arguments for example, and returns. In step S32 of FIG. 13, the system control processor analysis block 48#i calls the system restart activation analysis block 50#i.

(e) Operation of the system restart activation analysis block 50#i:

In step S80 of FIG. 15, the system restart activation analysis block 50#i collects the system restart escalation condition table 38#i. In step S82, the system restart activation analysis block 50#i sets the system restart activation timing type and the number of processors as arguments for example and returns. In the current example, the system restart activation timing type 1 is set.

(c-1) Operation of the system restart control block 46#0 of the MPR 20#0:

In step S34 of FIG. 13, the system restart control block 46#0 acquires the own processor number 0 from the HDD 24#0 for example. In step S36, because the failing processor number is 0 and the own processor number is 0, the system restart control block 46#0 determines that there is a match between these processor numbers and goes to step S38.

In step S38, because the own processor number is 0 and the current system processor number is 0, the system restart control block 46#0 determines that there is a match between these processor numbers and goes to step S40. In step S40, because the own processor number is 0 and the new system processor number is 0, the system restart control block 46#0 determines that there is a match between these processor numbers and goes to step S42. In step S42, the system restart control block 46#0 calls the initialization notice block 52#0. In step S44, the system restart control block 46#0 calls the system restart activation block 54#0. Thus, system restart is performed in all of processors 20#i (i=0 to n).

(c-2) Operation of the system restart control block 46#i of the CPR 20#i (i≧1):

In step S34 of FIG. 13, the system restart control block 46#i acquires own processor number i (i≧1) from the HDD 24#i for example. In step S36, because the failing processor number is 0 and the own processor number is i (i≧1), the system restart control block 46#i determines that there is no match between these processor numbers and goes to step S46. In step S46, because the own processor number is i (i≧1) and the new system processor number is 0, the system restart control block 46#i determines that there is no match between these processor numbers and returns.

Third Embodiment

Figure 19:
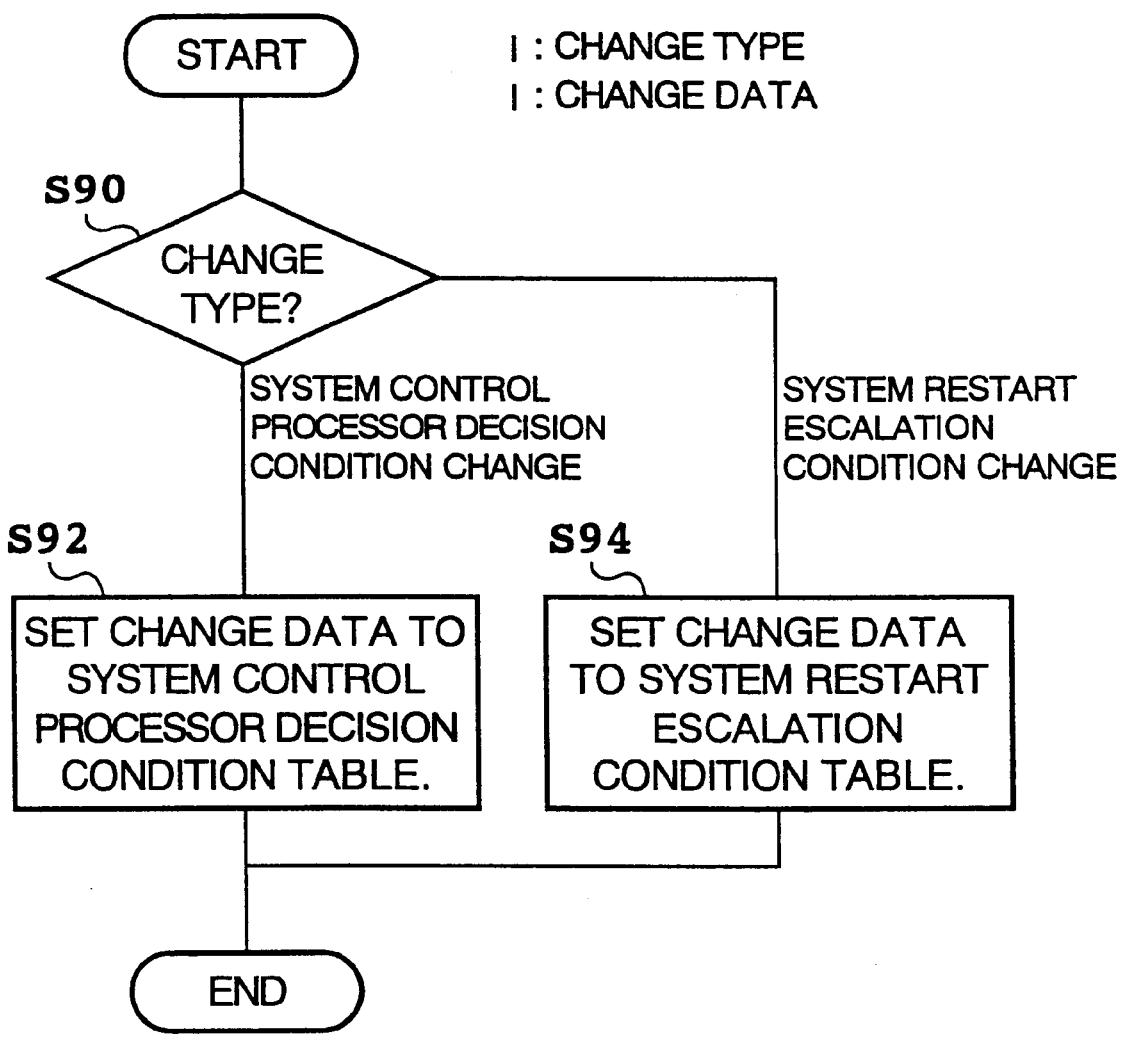
FIG. 19 is a flowchart indicative of the operation of a condition table change control block 58#i shown in FIG. 3.

Sometimes, updating of the system control processor decision table 36#i or the system restart escalation condition table 38#i is desired during operation. For example, as CPRs are added for service enhancement, change of the number of processors is desired. In such a case, maintenance personnel inputs from the input/output device 28 the change type (for example, the system restart escalation condition table) of the system control processor decision table 36#i and the system restart escalation condition table 38#i and the change data (for example, the number of processors of 3). The condition data acceptance block 56#0 receives the change type and the change data, sends them to the condition data acceptance block 56#i (i≧1) through the IF block 25#0 and the processor connection facility 26, and calls the condition table change control block 58#0. On the other hand, upon reception of the change type and the change data, the condition data acceptance block 56#i (i≧1) calls the condition table change control block 58#i. FIG. 19 shows a flowchart indicative of the operation of the condition table change control block 58#i shown in FIG. 3. In step S90 of FIG. 19, the condition table change control block 58#i determines the change type. If the change type is for changing the system control processor decision condition table 36#i, then the condition table change control block 58#i goes to step S92. If the change type is for changing the system restart escalation condition table 38#i, then the condition table change control block 59#i goes to step S94. In step S92, the condition table change control block 58#i sets the change data to the system control processor decision condition table 36#i.

In step S84, the condition table change control block 58#i sets the change data to the system restart escalation condition table 38#i. Thus, system processor selection and system restart can be controlled according to the changed system processor decision condition table 36#i and the system restart escalation condition table 38#i even during system operation without discontinuing the service.

As described and according to the invention, there is no need for the system control processor to be fixed and therefore the function of the system control processor can be shifted to another processor, thereby ensuring the continuity of system operations. In addition, combining the escalation condition for system restart with the system control processor decision condition permits setting of various system restart escalation conditions according to system configurations.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A multiprocessor system in which a plurality of processor systems including processors assigned with unique processor numbers are interconnected by a processor connection facility, each of said plurality of processor systems comprising:

first storage means for storing a number of a failing processor among said processors;

first notice acceptance means for accepting through said processor connection facility a first notice of the failing processor number of another processor and writing said failing processor number to said first storage means;

second notice acceptance means for accepting a second notice of initialization from another processor system through said processor connection facility to initialize own processor;

notice means for issuing a third notice of the initialization to all other processor systems through said processor connection facility;

system control processor analysis means for determining, on the basis of said failing processor number stored in said first storage means, a system control processor from among the normally operating processors; and system restart control means for instructing said notice means to issue said third notice and initializing own processor if own processor matches said system control processor determined by said system control processor analysis means when system restart has been determined to be performed on the basis of said failing processor number stored in said first storage means.

2. A multiprocessor system as claimed in claim 1, wherein each of said plurality of processor systems further comprises second storage means for storing a decision condition for determining said system control processor and said system control processor analysis means determines said system control processor on the basis of said failing processor number stored in said first storage means and said decision condition stored in said second storage means.

3. A multiprocessor system as claimed in claim 1, wherein each of said plurality of processor systems still further comprises third storage means for storing a system restart escalation condition and said system restart control means determines whether to perform system restart on the basis of said failing processor number stored in said first storage means and said escalation condition stored in said third storage means.

4. A multiprocessor system as claimed in claim 2, further comprising first condition changing means for changing said decision condition during a system operation.

5. A multiprocessor system as claimed in claim 3, further comprising second condition changing means for changing said escalation condition during a system operation.

6. A multiprocessor system as claimed in claim 2, wherein said decision condition determines that the processor having the smallest processor number except for the processor having said failing processor number stored in said first storage means becomes said system control processor.

7. A multiprocessor system as claimed in claim 2, wherein said decision condition determines that the processor having the largest processor number except for the processor having said failing processor number stored in said first storage means becomes said system control processor.

8. A multiprocessor system as claimed in claim 2, wherein said decision condition determines that the processor next in number to the processor having said failing processor number stored in said first storage means becomes said system control processor.

9. A multiprocessor system as claimed in claim 3, wherein said escalation condition determines system restart when the number of failing processors is n or more ($n \geq 1$).

* * * * *